US006412787B1

United States Patent
Pardi et al.

(10) Patent No.: US 6,412,787 B1
(45) Date of Patent: Jul. 2, 2002

(54) CHILDREN'S RIDE-ON VEHICLE

(75) Inventors: Jared Paul Pardi, East Aurora; Daniel J. Damon, West Seneca, both of NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/499,595

(22) Filed: Feb. 7, 2000

(51) Int. Cl.[7] .............................................. A63G 19/00
(52) U.S. Cl. .......................... 280/1.202; 280/1.165; 280/1.14; 280/1.206; 280/1.183; 180/216
(58) Field of Search ...................... 280/1.165, 1.206, 280/1.202, 1.14, 1.16, 1.13, 1.182, 1.186, 1.188, 1.192, 1.201, 1.203, 1.208, 1.22, 87.01, 87.021, 87.05; 180/216; 446/270, 297, 391; 472/98, 99

(56) References Cited

U.S. PATENT DOCUMENTS

| | | | |
|---|---|---|---|
| 91,398 A | 6/1869 | Wirtz | 280/257 |
| 101,310 A | 3/1870 | Purroy | 280/256 |
| 184,435 A | 11/1876 | Slemmer | 280/1.165 |
| 199,518 A | 1/1878 | Crandall | 280/1.167 |
| 202,056 A * | 4/1878 | Scharf | 280/1.16 |
| 209,777 A | 11/1878 | Ross | 280/1.165 |
| 495,531 A | 4/1893 | Thorp | 180/11 |
| 526,775 A * | 10/1894 | Foster | 280/87.01 |
| 556,294 A * | 3/1896 | Whipple | 280/87.01 |
| 632,278 A | 9/1899 | Plass | 30/299 |
| 721,855 A * | 3/1903 | Belenger | 280/1.202 |
| 777,369 A * | 12/1904 | Hayes | 280/1.14 |
| 787,670 A | 4/1905 | Hyde | 280/256 |
| 808,616 A | 12/1905 | Thompson | 280/1.167 |
| 908,229 A | 12/1908 | Fahrney | 280/1.16 |
| 922,639 A * | 5/1909 | Spencer | 280/1.16 |
| 970,849 A | 9/1910 | Pettit et al. | 280/1.167 |
| 990,997 A | 5/1911 | Magee | 280/1.16 |
| 1,284,460 A * | 11/1918 | Ross et al. | 280/87.01 |
| 1,315,093 A * | 9/1919 | Converse | 280/87.05 |
| 1,359,302 A * | 11/1920 | Whitaker | 280/87.05 |
| 1,362,826 A * | 12/1920 | Skolnik | 280/87.01 |
| 1,384,738 A * | 7/1921 | Bellairs | 280/87.05 |
| 1,439,394 A | 12/1922 | Banks | 280/1.192 |
| 1,470,441 A * | 10/1923 | Green | 280/87.05 |
| 1,569,498 A * | 1/1926 | Jousset et al. | 280/87.01 |
| 1,585,197 A | 5/1926 | Marcoux | 280/1.167 |
| 1,772,794 A * | 8/1930 | Arney | 280/1.16 |
| 1,808,887 A | 6/1931 | Dunkley | 280/1.192 |
| 1,827,401 A * | 10/1931 | Rader | 280/87.01 |
| 2,244,447 A * | 6/1941 | Dann | 280/87.01 |
| 2,253,096 A * | 8/1941 | Sheldon | 280/87.01 |
| 2,334,387 A * | 11/1943 | Curty | 280/87.01 |
| 2,513,661 A * | 7/1950 | Martin | 280/1.202 |
| D160,792 S * | 11/1950 | Fever, Jr. | 280/87.01 |
| 2,740,636 A * | 4/1956 | Dix | 280/1.14 |
| 2,794,649 A | 6/1957 | Arndt et al. | 280/1.165 |
| 3,017,193 A * | 1/1962 | Klein | 280/1.14 |
| 3,055,672 A * | 9/1962 | Parks | 280/1.14 |
| 3,100,120 A * | 8/1963 | Cleary | 280/87.01 |
| 3,284,090 A * | 11/1966 | Blair | 280/1.202 |
| 3,370,861 A * | 2/1968 | Lenta | 280/1.202 |
| 3,514,117 A | 5/1970 | Olsen | 280/1.192 |
| 4,546,989 A | 10/1985 | Peterson | 280/1.16 |
| 5,074,820 A | 12/1991 | Nakayama | 446/29 |
| 5,316,515 A | 5/1994 | Hyman et al. | 446/28 |
| 5,697,621 A | 12/1997 | Nazarian | 280/1.165 |

* cited by examiner

*Primary Examiner*—Brian L. Johnson
*Assistant Examiner*—Bridget Avery
(74) *Attorney, Agent, or Firm*—Kolisch, Hartwell, Dickinson, McCormack & Heuser, PC

(57) ABSTRACT

A children's ride-on vehicle that simulates a horse-drawn carriage. The invention includes a carriage section adapted to support a rider, and a horse section coupled to the carriage. One or more wheels are coupled to the carriage and/or horse sections. In one embodiment, the vehicle includes a rein assembly configured to allow a child to steer at least one of the wheels. In another embodiment, at least one of the wheels is configured to impart a vertically reciprocating motion to the vehicle when the vehicle is moving. In another embodiment, the vehicle includes a sound generation system to simulate noises produced by a horse.

19 Claims, 4 Drawing Sheets

CHILDREN'S RIDE-ON VEHICLE

FIELD OF THE INVENTION

The present invention relates generally to children's ride-on vehicles, and more particularly to a children's ride-on vehicle that simulates a horse-drawn carriage.

BACKGROUND AND SUMMARY OF THE INVENTION

Children's ride-on vehicles have become increasingly popular with children in recent years. Children's ride-on vehicles are typically sized to carry one or more children, and often are electrically-powered and allow children to pretend that they are operating the full-size vehicles operated by adults. Indeed, a ride-on vehicle that successfully simulates the experience of operating an actual vehicle is more likely to stimulate a child's imagination and increase the child's enjoyment during play. As a result, manufacturers of children's ride-on vehicles often shape and/or ornament their ride-on vehicles to resemble actual automobiles, trucks, motorcycles, and the like.

The present invention provides a children's ride-on vehicle that simulates a horsedrawn carriage. The invention includes a carriage section adapted to support a rider, and a horse section coupled to the carriage. One or more wheels are coupled to the carriage and/or horse sections. In one embodiment, the vehicle includes a rein assembly configured to allow a child to steer at least one of the wheels. In another embodiment, at least one of the wheels is configured to impart a vertically reciprocating motion to the vehicle when the vehicle is moving. In another embodiment, the vehicle includes a sound generation system to simulate noises produced by a horse.

DETAILED DESCRIPTION AND BEST MODE OF THE INVENTION

Figure 1:
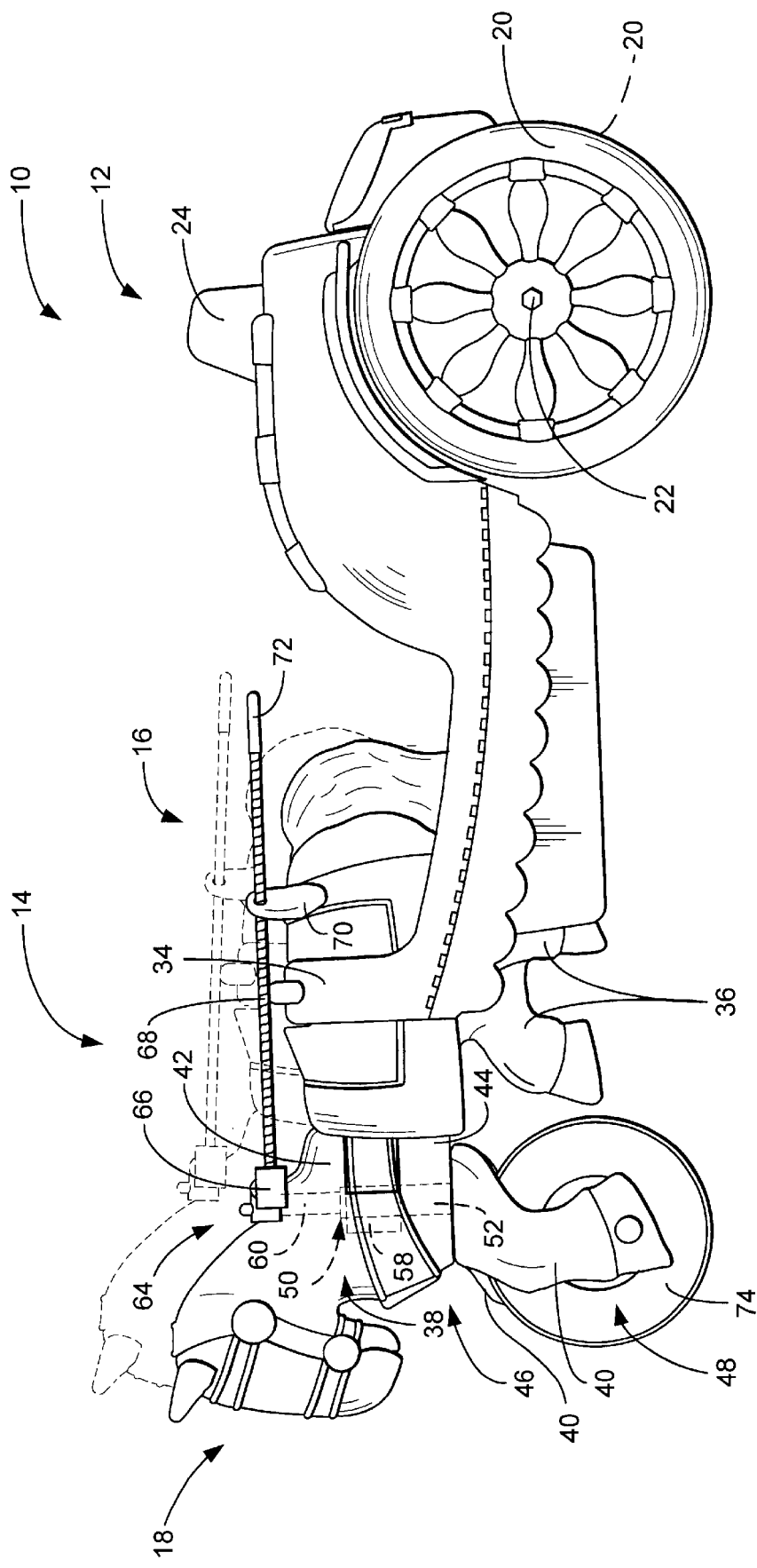
FIG. 1 is a side elevation of one embodiment of a children's ride-on vehicle according to the present invention, in which the front wheel is eccentrically coupled to the horse section and is steerable by a rein assembly.

A children's ride-on vehicle according to the present invention is indicated generally at 10 in FIG. 1. Vehicle 10 includes a carriage section 12 adapted to support a rider, and a horse-shaped section 14. The horse-shaped section includes a rear horse portion 16 attached to carriage section 12, and a front horse portion 18 pivotally coupled to rear horse portion 16. Vehicle 10 is configured to allow a child to ride in carriage section 12 and steer the vehicle by pivoting front horse portion 18.

While an exemplary embodiment of the invention is described herein as simulating a horse-drawn carriage, it will be understood that vehicle 10 may alternatively include any desired combination of animal and rider-supporting carrier as a frame for vehicle 10. For example, section 14 may be formed in the shape of other animals including oxen, elephants, dogs, etc. Section 14 also may be formed in the shape of plural animals such as a team of horses, etc. Similarly, carriage 12 may be in the form of other carriers including a covered wagon, sled, etc.

In the exemplary embodiment, vehicle 10 includes a pair of rear wheels 20 rotatably coupled to carriage section 12 by one or more rear axles 22. While the rear portion of the carriage section is supported by wheels 20, the front portion is supported by horse-shaped section 14. The use of two wheels disposed adjacent the rear sides of carriage section 12 provides a stable platform for operation and play by small children. Alternatively, fewer or more wheels may be coupled to the carriage section as desired.

Figure 2:
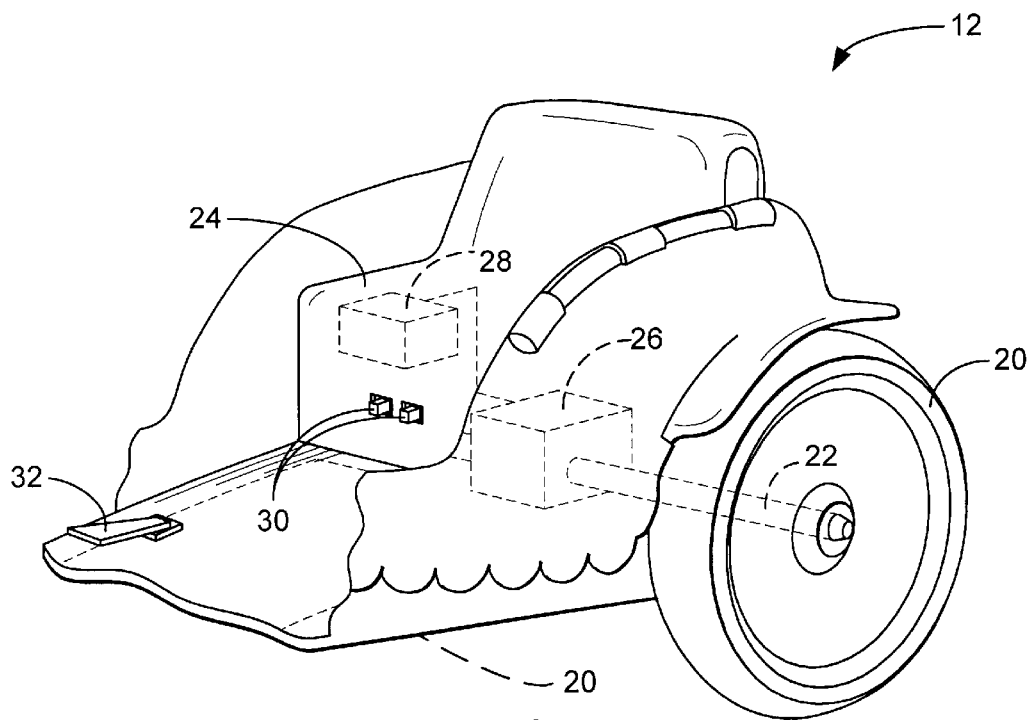
FIG. 2 is a fragmentary isometric view of the carriage section of FIG. 1, showing the position of the motor and drive assembly and the battery assembly beneath the seat. Operator controls for controlling the drive assembly are also shown positioned in the carriage section.

As shown in FIG. 2, carriage section 12 also includes a seat 24 adapted to support the rider. Seat 24 is positioned generally between rear wheels 20 and covers rear axle 22. Seat 24 also covers a drive and motor assembly 26 operably coupled to the rear axle to drive at least one of rear wheels 20. In the exemplary embodiment, one or more batteries 28 are disposed beneath the seat and operably connected to supply electrical power to the battery-powered motor assembly, which powers the drive assembly. Batteries 28 may be rechargeable or single-use, and preferably are housed in a location readily accessible when the batteries need to be removed and replaced. For example, seat 24 may be removable to provide access to the one or more batteries used to power the vehicle. Positioning the drive and motor assembly and the batteries beneath seat 24 prevents tampering by a child and thereby enhances the safety of vehicle 10. Alternatively, the drive and motor assembly and the batteries may be positioned at any other location on the vehicle.

The drive and motor assembly is controllable by a rider through one or more switches 30 and/or one or more foot pedals 32, which are operably coupled to the motor. Foot pedal 32 may provide any of a variety of control functions including acceleration, braking, etc. In the exemplary embodiment, drive assembly 26 is configured to accelerate upon depression of foot pedal 32 and automatically brake when the foot pedal is released. Switches 30 may also provide any of a variety of functions including forward/reverse selection, low-speed/high-speed selection, power-on/power-off selection, etc. While switches 30 are depicted as two push-button switches, it will be appreciated that more or less switches of similar or different types may be used as needed.

There are a variety of suitable drive and motor assemblies and batteries such as described above that are well known to those of skill in the art. Alternatively, vehicle 10 may be propelled by other means. Alternatively, the motor and batteries may be omitted and drive assembly 26 may include one or more pedals such as typically found on bicycles to allow the rider to power the drive assembly manually. In another embodiment, drive assembly 26 is omitted and the floor portion of carriage section 12 is open, such as indicated in dashed lines in FIG. 2, to allow riders to propel the vehicle by pressing their feet against the ground.

Returning attention to FIG. 1, the front end of carriage section 12 includes a yoke member 34 adapted to rigidly attach to rear portion 16 of horse-shaped section 14 by any suitable means such as bolts, a friction fit, deformable clips, etc. In the exemplary embodiment, the yoke member is attached to a region of rear portion 16 resembling the mid-back of the horse. Thus, the rear-most region of horse-shaped section 14 extends into, and is supported by, carriage section 12. Rear leg portions 36, which extend from rear portion 16, typically are suspended above the ground.

Figure 3:
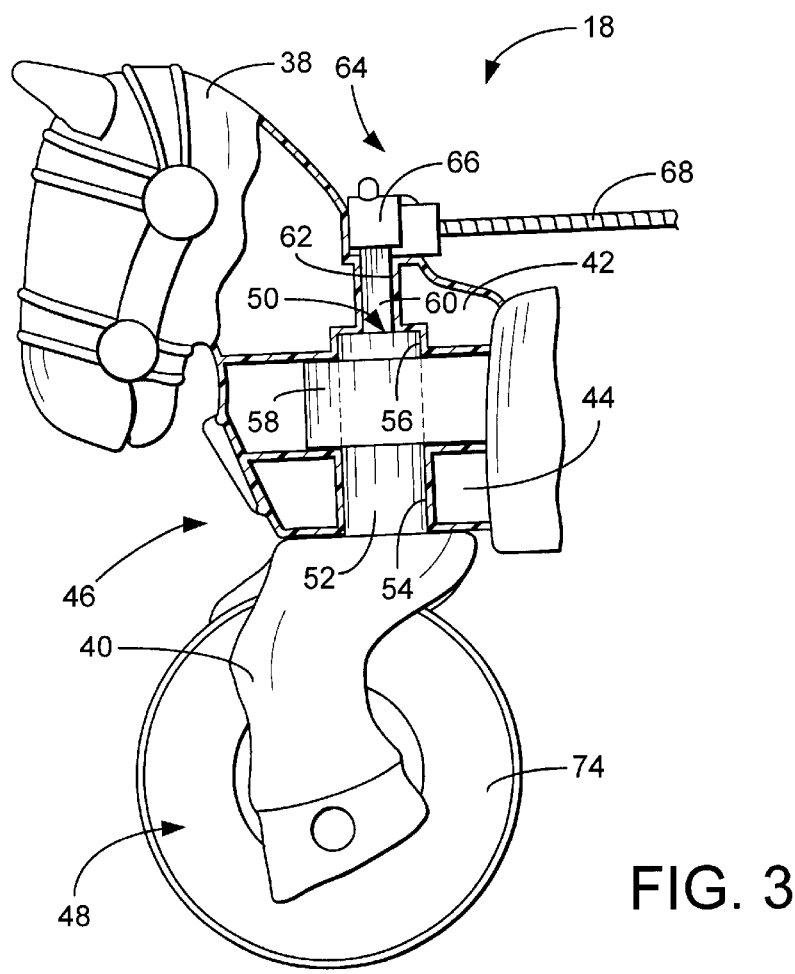
FIG. 3 is a partial cross-sectional view of the front portion of the horse section of FIG. 1, showing the engagement of the steering column with the front and rear horse portions and the rein assembly.

Front horse portion 18 includes a head portion 38 and a pair of front leg portions 40. Head portion 38 includes an upper flange 42 and a lower flange 44 which are spaced apart and extend in a generally rearward, parallel direction. Front leg portions 40 define a fork assembly 46 adapted to mount on a front wheel assembly 48, as will be described in more detail below. As best seen in FIG. 3, fork assembly 46 includes a generally vertical steering column 50. A lower end 52 of the steering column adjacent the lower leg portions has a generally circular cross-section.

Lower end 52 is sized to be received within a circular aperture 54 formed in lower flange 44, and to extend upward to a circular recess 56 in the bottom of upper flange 42. The front end of rear horse portion 16 includes a collar 58 having a circular aperture sized to receive the lower end of steering column 50. Collar 58 is received into head portion 38 between upper flange 42 and lower flange 44 so that the lower end of the steering column passes through the aperture in collar 58 to pivotally connect front portion 18 to rear portion 16. Since rear portion 16 is rigidly attached to carriage section 12, front portion 18 is also pivotally connected to the carriage section.

An upper end 60 of steering column 50 has a generally rectangular cross-section and extends upward through a rectangular aperture 62 in the top of upper flange 42. Upper end 60 is sized to fit relatively tightly within aperture 62 to ensure that head portion 38 pivots about collar 58 in tandem with steering column 50, front leg portions 40, and front wheel assembly 48. End 60 and aperture 62 may have any other suitable shape, however, it is preferred that the shapes correspond with each other, as discussed above.

An exemplary embodiment of vehicle 10 has been described above in which front portion 18 is pivotally coupled to rear portion 16 and carriage section 12 by a steering column that extends upward through both the front portion and the rear portion. However, it will be appreciated that there are many other ways in which the front portion may be pivotally coupled to the rear portion within the scope of the invention.

Vehicle 10 also includes a rein assembly 64 coupled to front portion 18. Rein assembly 64 includes a laterally elongate pivot member 66 rigidly attached to upper end 60 of the steering column where it extends out of upper flange 42. Pivot member 66 includes an aperture (not shown), which is sized to receive upper end 60. One or more reins 68 are coupled to the pivot member on either side of the steering column. It will be understood that the reins may include a single elongate member with opposing ends attached on either side of the steering column, or may include separate members as shown in FIG. 1. The reins may be formed of any suitable material including rope, fabric, plastic, etc. In any event, reins 68 extend rearward toward the carriage section for operation by a rider. One or more guide members 70 are attached to rear portion 16 and are adapted to receive the reins and hold the reins adjacent the carriage when not in use. The ends of reins 68 adjacent the rider may include handles 72 to allow the rider to grip the reins more easily.

Thus, a rider may steer front portion 18 (and thereby vehicle 10) by pulling on the appropriate rein. The rider pulls on the left rein to steer to the left and on the right rein to steer to the right. Guide members 70 ensure that only a rearward pulling force is applied to the pivot member. The pulling force exerted on the rein by the rider is translated into a pivoting force on pivot member 66. Due to the rigid attachment of the pivot member to the steering column, the rider's pulling force is translated into a pivoting force on the steering column, thereby allowing the rider to steer front portion 18 and front wheel assembly 48. In alternative embodiments, rein assembly 64 may be omitted and the rider may steer vehicle 10 by other means such as a steering wheel, handle bar, etc.

As described above, vehicle 10 provides a children's ride-on vehicle configured to resemble a horse-drawn carriage. The incorporation of the steering and fork assemblies into the horse-shaped section, and the configuration of the rein assembly for steering the vehicle provide a realistic simulation of an actual horse-drawn carriage to stimulate a child's imagination and increase the child's enjoyment during play.

The resemblance of vehicle 10 to a horse-drawn carriage is increased by simulating the typical motion of a horse-drawn carriage. It will be appreciated that there are many ways in which a vertically reciprocating motion may be imparted to the frame of vehicle 10 when the vehicle is moving. In the exemplary embodiment depicted in FIG. 1, front wheel assembly 48 is eccentrically coupled to fork assembly 46. As indicated by the dashed lines in FIG. 1, the eccentric coupling of the front wheel assembly to the fork assembly causes front portion 18 to move up and down as the vehicle travels across the ground. Likewise, rear portion 16 and carriage section 12 also move up and down due to their connection to the front portion.

It should be noted that for clarity, the dash lines in FIG. 1 are only shown to indicate movement of the horse-shaped section. However, it will be understood that carriage section 12 moves in tandem with the horse-shaped section. Furthermore, while the motion is described as being vertically reciprocating, the precise motion imparted to the frame of vehicle 10 will vary depending on which wheel assemblies are eccentrically mounted. In the embodiment in which only the front wheel assembly is eccentrically mounted, the vehicle frame will move up and down as it pivots about rear axle 22. Alternatively, rear wheels 20 may be eccentrically mounted to the frame in addition to, or instead of, front wheel assembly 48 to impart a different vertically reciprocating motion to the frame.

Figure 4:
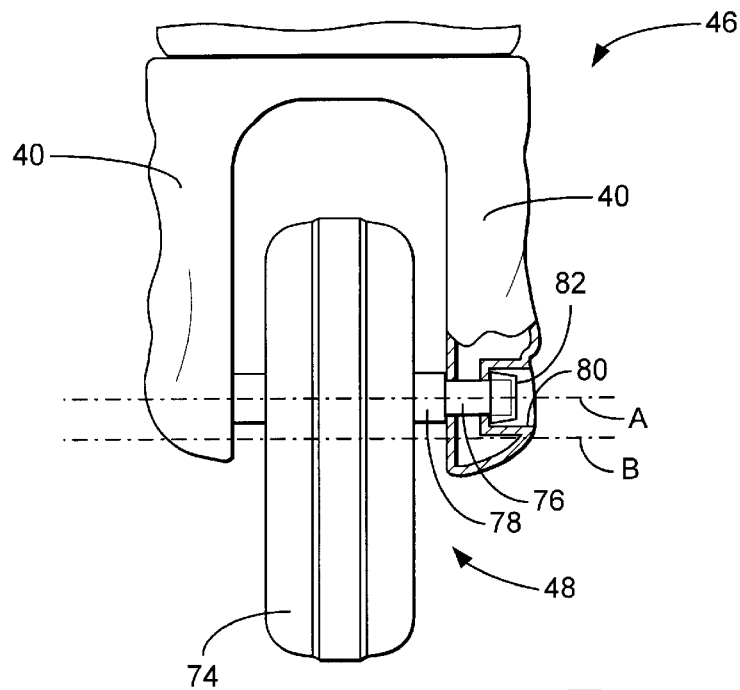
FIG. 4 is a front elevation of a fork assembly and front wheel according to the present invention, with a portion of the fork assembly shown in cross-section to illustrate the coupling of the axle to the fork assembly.

The eccentric coupling of wheel assembly 48 to fork assembly 46 can best be seen in FIG. 4. As shown, wheel assembly 48 includes a front wheel 74 rotatably mounted on a front axle 76. One or more axle bushings 78 extend through wheel 74 along an eccentric axis of the wheel indicated at A. Bushings 78 are sized to receive, and rotate about, axle 76. The axle extends between front leg portions 40, where it is received into circular bores 80. Press-fit end caps 82 hold the axle in place within bores 80.

Eccentric axis A is spaced-apart from the centric axis of the wheel, which is indicated at B. The amount of vertical travel imparted to the frame will vary depending on the degree of eccentricity with which the front wheel assembly is coupled to the frame. In other words, the amount of vertical travel imparted to the region of the frame adjacent the wheel assembly will be approximately twice the spacing between eccentric axis A and centric axis B.

Figure 5:
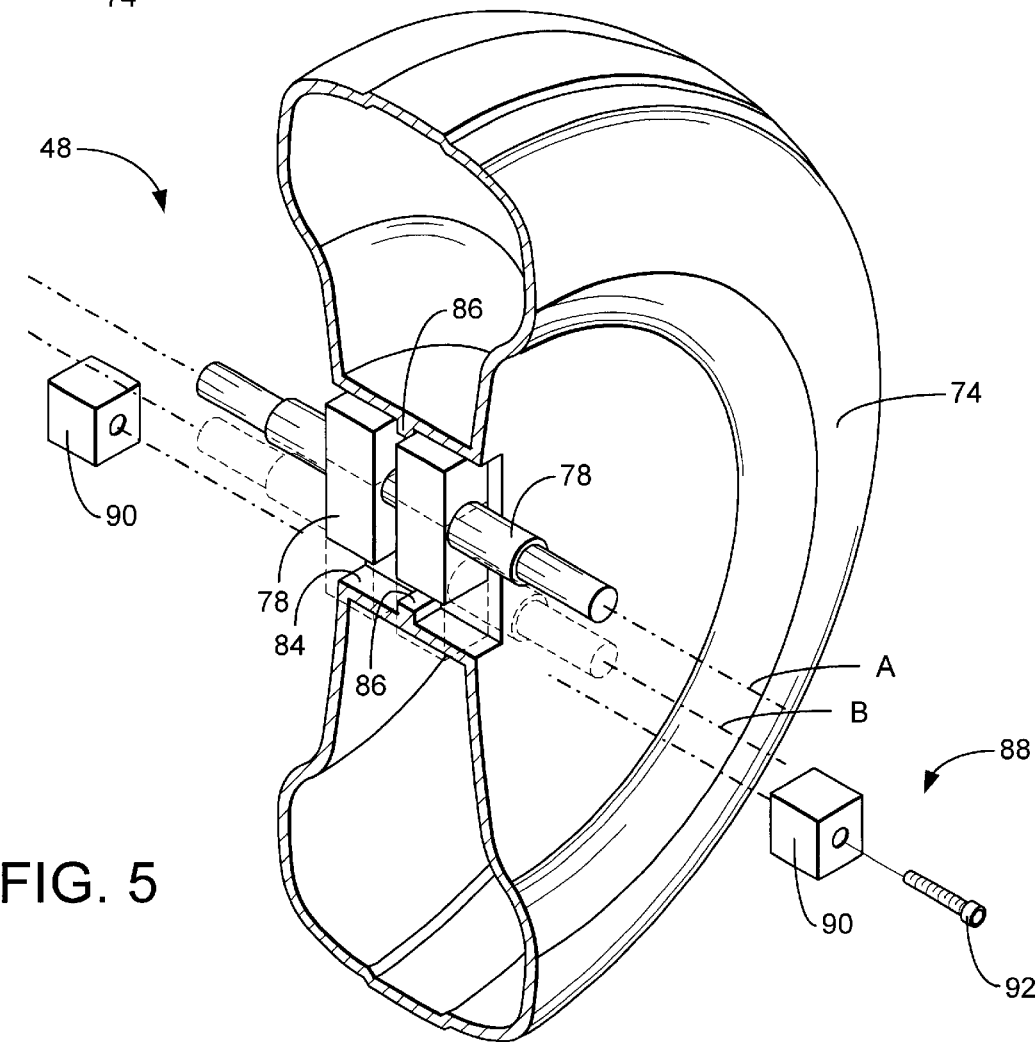
FIG. 5 is an isometric view of an adjustable wheel assembly according to the present invention, with the wheel shown in cross-section to illustrate the adjustable position of the axle within the elongate axle bore.

As some riders may occasionally prefer a smooth ride, in another embodiment of the invention the wheels are all concentrically mounted. In still another embodiment, at least one wheel assembly is selectively adjustable between a first configuration, in which the wheel assembly imparts a vertically reciprocating motion to the frame, and a second configuration, in which the wheel assembly does not impart a vertically reciprocating motion to the frame. It will be appreciated that there are a variety of suitable ways to provide such adjustability within the scope of the invention. An exemplary adjustable front wheel assembly 48 is shown in FIG. 5, in which the front wheel assembly is eccentrically coupled to the fork assembly in the first configuration, and is centrically coupled to the fork assembly in the second configuration.

In the exemplary embodiment, front wheel includes an elongate or oblong bore 84 positioned asymmetrically about the centric axis B. Axle bushings 78 are adapted to be slidably received within bore 84. A rib 86 extends about the middle of bore 84 to laterally center the pair of axle bushings within the bore. Axle bushings 78 are thus able to slide within the bore from one end to the other in a direction non-parallel to centric axis B. Alternatively, the axle bushings may be omitted and the axle may slide in direct contact with the bore.

Front wheel assembly 48 also includes a spacer 88 adapted to be received within the bore, and which is selectively positionable on either side of the axle bushings to maintain the axle bushings at a selected end of the bore. Spacer 88 includes a pair of blocks 90 connectable by a screw 92. The spacer is installed in the bore by placing a block on either side of rib 86 and connecting the blocks with screw 92. Rib 86 maintains the spacer in a laterally central location within the bore. In an alternative embodiment, the oblong bore may be positioned symmetrically about the centric axis and a plurality of selectively positionable spacers may be used. In a further alternative, the axle may be positioned asymmetrically within the axle bushings.

When the wheel assembly is in the first configuration, the axle bushings are adjacent the end of the bore distal from the centric axis, and the axle is in a first position in which it extends generally along eccentric axis A. When the wheel assembly is in the second configuration, the axle bushings are adjacent the opposite end of the bore proximate the centric axis and the axle is in a second position in which it extends generally along the centric axis. Wheel assembly 48 may be adjusted between the first and second configurations by removing spacer 88, sliding axle bushings 78 to the selected end of the oblong bore, and reinstalling the spacer in the open end of the bore.

Thus, the wheel assembly may be adjusted between the first and second configurations without requiring disassembly of the front wheel from the fork assembly. As a result, press-fit end caps 82 may be used to securely couple the axle to the fork assembly. This prevents a child from accidentally loosening or removing the front wheel.

In a further alternative embodiment of the invention, vehicle 10 includes a sound generation system configured to simulate noises typically made by a horse. These simulated noises further stimulate a child's imagination and increase the child's enjoyment during play. It will be appreciated that the sound generation system may be adapted to produce one or more of a wide variety of noises within the scope of the invention. Further, the sound generation system may be configured to produce the noises continuously, randomly, or in response to a selected stimulus. For example, the sound generation system may be configured to produce noises when the vehicle is in motion, when the rider exerts force on the reins, when the rider speaks a keyword, etc. Further, the system may be configured to produce different noises in response to different stimuli. In the exemplary alternative embodiment shown in FIG. 6, the sound generation system is configured to produce simulated noises produced by a horse when a region on the horse is moved such as by petting, grooming, etc.

Figure 6:
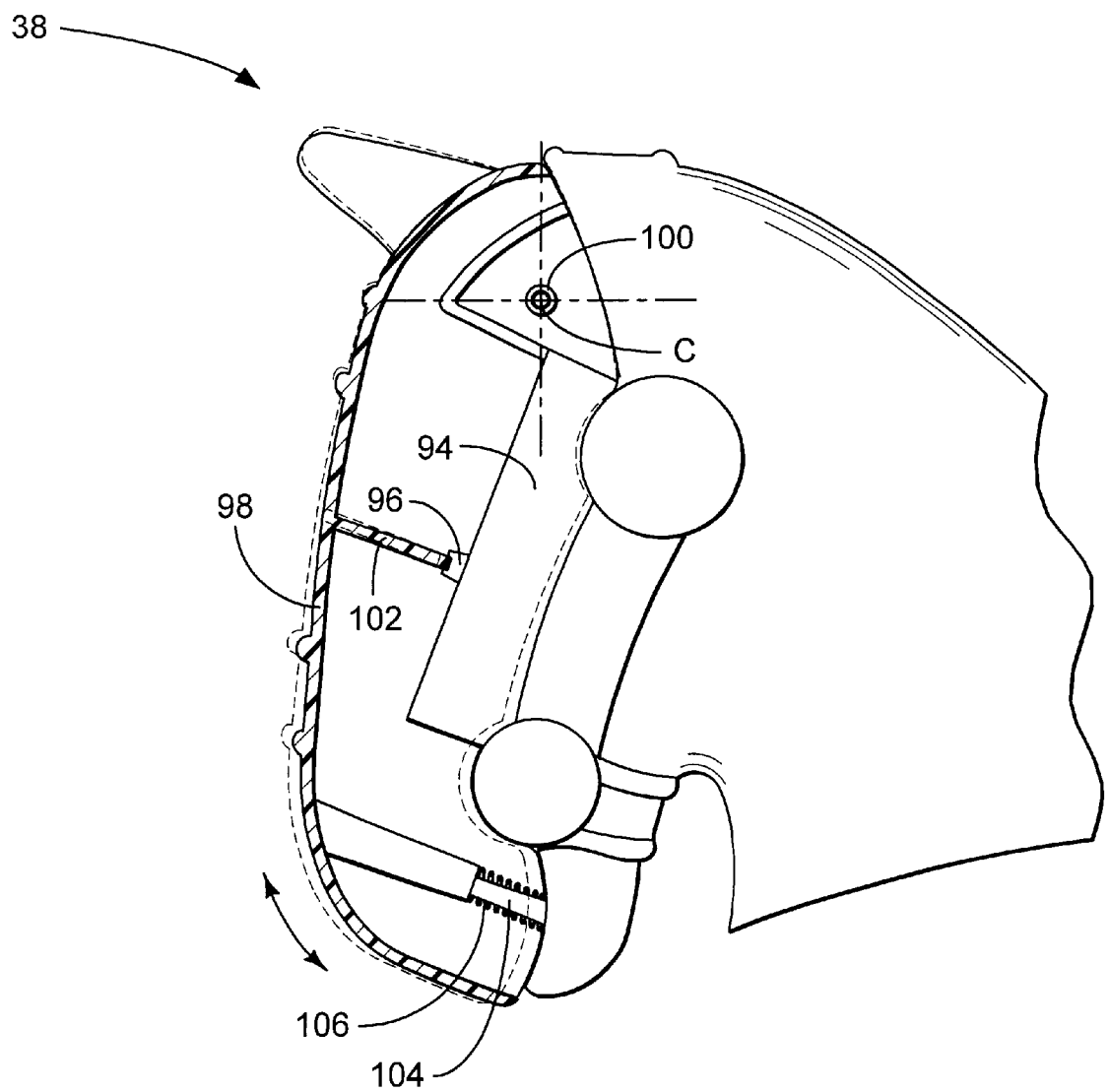
FIG. 6 is a side elevation of a front horse portion according to the present invention, with a movable region of the head of the horse shown in cross-section to illustrate the pivotal connection of the movable region to the front horse portion and the actuation of the sound generation system by the movable region.

As shown in FIG. 6, the vehicle includes a sound generation system 94 disposed in a recess (not shown) within head portion 38 of the horse-shaped section. System 94 typically is a battery-operated electronic sound generation system such as is well-known in the art. Selected sounds may be generated by system 94 through known sound-roducing producing devices, or may be recorded and stored on system 94 for repeated playback. System 94 includes one or more push-button actuator switches 96. When one of switches 96 is actuated (i.e., pushed in), system 94 produces one or more prerecorded sounds. System 94 may include a plurality of switches configured to trigger a plurality of different noises within the scope of the invention. Additionally, different types of actuator switches may be used as needed such as toggle switches, rocker switches, touch-sensitive switches, etc.

Head portion 38 includes a movable region 98 shaped to resemble the exterior face of horse-shaped section 14. Head portion 38 includes a pair of pivot mounts 100 extending to either side of the head portion to define a pivot axis indicated at C. Movable region 98 is coupled to mounts 100, such as by screws (not shown), to pivot about axis C. Movable region 98 extends downward to cover sound generation system 94. Thus, the movable region is configured to pivot toward and away from system 94. Movable region 98 includes at least one internal projecting member 102 disposed adjacent one or more of the actuator switches 96. When region 98 is pivoted toward system 94, the projecting member strikes the switch and actuates the sound generation system.

Movable region 98 is also coupled to head portion 38 at a spring mount 104 such as by a screw (not shown). Spring mount 104 is adapted to engage movable region 98 while producing a biasing force on the region in a direction transverse to pivot axis C. In the exemplary embodiment shown in FIG. 6, spring mount 104 includes a compression spring 106 disposed between movable region 98 and head portion 38. Spring 106 biases movable region to pivot away from sound generation system 94 and switches 96. Thus, movable region 98 does not actuate switches 96 unless the movable region is pressed inward against the bias of spring 106, such as when a child pets the face of the horse-shaped section. This configuration of horse-shaped section 14 and sound generation system 94 simulates an actual horse that responds to being petted.

Although an exemplary embodiment of the invention has been described as having a single sound generation system disposed within the head portion of the horse-shaped section, it is within the scope of the invention to provide a plurality of sound generation systems adjacent movable regions dispersed at various locations around the vehicle.

Alternatively, a single sound generation system may be responsive to a plurality of actuators dispersed around the vehicle.

While the invention has been disclosed in its preferred form, the specific embodiments thereof as disclosed and illustrated herein are not to be considered in a limiting sense as numerous variations are possible. It is intended that any singular terms used herein do not preclude the use of more than one of that element, and that embodiments utilizing more than one of any particular element are within the spirit and scope of the present invention. Applicants regard the subject matter of the invention to include all novel and non-obvious combinations and subcombinations of the various elements, features, functions and/or properties disclosed herein. No single feature, function, element or property of the disclosed embodiments is essential to all embodiments. The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

We claim:

1. A children's ride-on vehicle, comprising:
   a carnage section including a passenger region with a seat sized to receive a child and including one or more rear wheels;
   a horse-shaped section extending forward of the carriage section and comprising:
      a rear horse portion attached to the carriage section,
      a front horse portion having a head portion and a pair of front leg portions defining a fork assembly adapted to rotatably receive a front wheel assembly between opposed regions of the front leg portions, wherein the front horse portion is pivotally coupled to the rear horse portion, and
      a front wheel assembly coupled to the fork assembly and adapted to position and support the front horse portion above a ground surface, wherein the front wheel assembly includes at least one front wheel coupled to an axle that extends between the front leg portions such that the at least one front wheel is rotatable relative to the front leg potions; and
   a drive assembly having a motor assembly including at least one battery-powered motor adapted to drive at least one of the wheels.

2. The children's ride-on vehicle of claim 1, wherein the rear horse portion includes a collar, and wherein the fork assembly includes a steering column extending through the collar to pivotally couple the fork assembly to the rear horse portion.

3. The children's ride-on vehicle claim 1, further comprising a battery-powered sound generation system configured to simulate noises produced by a horse.

4. The children's ride-on vehicle of claim 3, wherein the battery-powered sound generation system is configured to generate the simulated noises in response to pressure applied to one or more selected regions of the horse-shaped section.

5. The children's ride-on vehicle of claim 1, wherein the at least one front wheel is eccentrically coupled to the axle.

6. The children's ride-on vehicle of claim 1, wherein the front wheel assembly is selectively adjustable between an eccentric coupling and a centric coupling.

7. The children's ride-on vehicle of claim 1, further comprising a rein assembly coupled to the front horse portion and adapted to pivot the front wheel assembly in response to forces exerted on the rein assembly by the rider.

8. The children's ride-on vehicle of claims 7, wherein the rein assembly includes a pivot member coupled to the fork assembly, and one or more reins coupled to the pivot member on either side of the fork assembly to allow the rider to steer the at least one front wheel with the reins.

9. The children's ride-on vehicle of claim 1, wherein the at least one battery-powered motor is disposed within the carriage section.

10. The children's ride-on vehicle of claim 1, further comprising at least one battery operably connected to tie motor assembly.

11. The children's ride-on vehicle of claim 1, wherein the drive assembly includes a foot switch operably coupled to the motor assembly and adapted to be operated by a child seated on the seat of the carriage section.

12. The children's ride-on vehicle of claim 1, wherein the front wheel assembly is selectively adjustable between a first configuration in which the front wheel assembly imparts a vertically reciprocating motion to the vehicle upon rotation of the at least one front wheel, and a second configuration in which the front wheel assembly does not impart a vertically reciprocating motion to the vehicle upon rotation of the at least one front wheel.

13. The children's ride-on vehicle of claim 6, wherein the front wheel assembly has an oblong bore configured to engage the axle such that the axle may slide within the bore in a direction non-parallel to a centric axis of the front wheel assembly.

14. The children's ride-on vehicle of claim 8, wherein the one or more reins are adapted to be pulled rearwardly toward the carriage section to effect a pivoting force on the pivot member.

15. The children's ride-on vehicle of claim 8, wherein the rein assembly includes at least one guide member adapted to receive the one or more reins wherein the at least one guide member is adapted to ensure that the primary force applied to the one or more reins is a rearward pulling force.

16. The children's ride-on vehicle of claim 10, wherein the at the one battery is disposed beneath the seat.

17. The children's ride-on vehicle of claim 10, wherein the seat is removable to provide access to the at least one battery.

18. The children's ride-on vehicle of claim 13, wherein the front wheel assembly further includes an axle bushing adapted to receive the axle and further adapted to be slidably received within the bore.

19. The children's ride-on vehicle of claim 18, wherein the front wheel assembly further includes a spacer adapted to be received within the bore and selectively positionable with respect to the axle bushing within the bore to maintain the front wheel assembly in a selected one of the centric coupling and the eccentric coupling.

* * * * *

UNITED STATES PATENT AND TRADEMARK OFFICE
CERTIFICATE OF CORRECTION

PATENT NO. : 6,412,787 B1
DATED : July 2, 2002
INVENTOR(S) : Jared Paul Pardi and Daniel J. Damon It is certified that error appears in the above-identified patent and that said Letters Patent is hereby corrected as shown below:

Column 7,
Line 25, before "section including a passenger" please delete "carnage" and insert -- carriage -- therefor.
Line 52, after "ride-on vehicle" please insert -- of --.

Column 8,
Line 17, after "operably connected to" please delete "tie" and insert -- the -- therefor.
Line 46, before "one battery" please delete "the" and insert -- least -- therefor.

Signed and Sealed this

Nineteenth Day of November, 2002

Attest:

JAMES E. ROGAN
Attesting Officer
Director of the United States Patent and Trademark Office